Sept. 8, 1931. C. A. FELL 1,822,772
CAGE OR CRATE FOR TRANSPORTING LIVESTOCK
Filed April 26, 1929  2 Sheets-Sheet 1

INVENTOR
Clarence Arnold Fell
BY
Connolly Bros,
ATTORNEYS

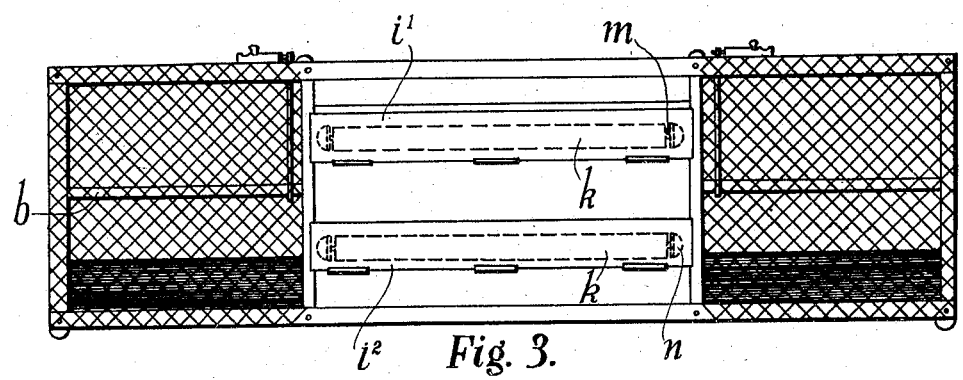
Fig. 3.
Fig. 4.
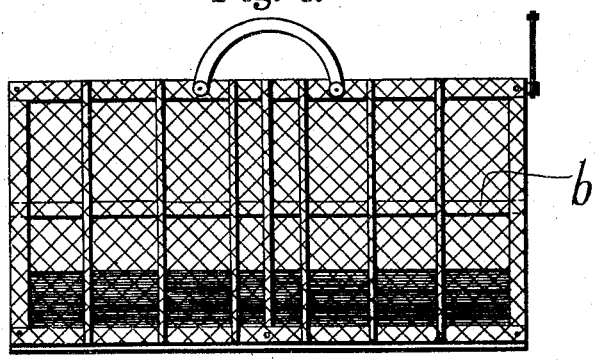
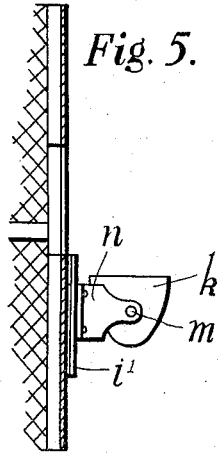
Fig. 5.
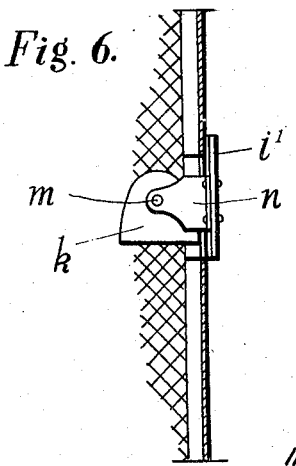
Fig. 6.

Patented Sept. 8, 1931

1,822,772

UNITED STATES PATENT OFFICE

CLARENCE ARNOLD FELL, OF ETWALL, ENGLAND

CAGE OR CRATE FOR TRANSPORTING LIVESTOCK

Application filed April 26, 1929, Serial No. 358,332, and in Great Britain June 12, 1928.

This invention relates to cages or crates for transporting livestock, more especially racing pigeons.

In carrying out my present invention an additional floor is provided, which, when in use, is held in suspension medially in the cage or crate by cords, chains, wires, hinges or the like, and retained in such position by bolts, hooks or other convenient means for instant release. When not required, this supplementary floor rests upon the base of the cage.

In some cases the movable floor is made in sections so as to fold or take apart, so that when not required it may be taken out and inserted at will.

Short lengths of chain or cord are connected to the upper ends of the suspension wires, cords or the like in order to enable the supplementary floor to be raised to the required height.

A further improvement according to this invention is the provision of two small auxiliary doors which are formed in the large door of the cage, each of these doors being preferably hinged at its top edge, and each having means for securing it in its closed and open position. These doors are provided for the entry and exit of the birds from the two compartments of the cage. A still further improvement comprises the provision of two water or food troughs, one for the upper, and one for the lower compartment of the cage, these food troughs being suspended or hinged, in such a manner, to the inner sides of two narrow doors in the back of the cage that they may be turned upside down for emptying and when not in use may remain in an inverted position in order to ensure them being kept clean and from being fouled.

In the accompanying sheets of drawings:—

Fig. 3 is a back elevation of Fig. 1;

Fig. 4 is an end elevation of Fig. 1;

Fig. 5 is an enlarged view, in section, of a portion of a cage showing the drinking or food trough attached to one of the doors; and Fig. 6 is a similar view showing the trough out of use.

Referring to the drawings:—

Figures 1, 2:
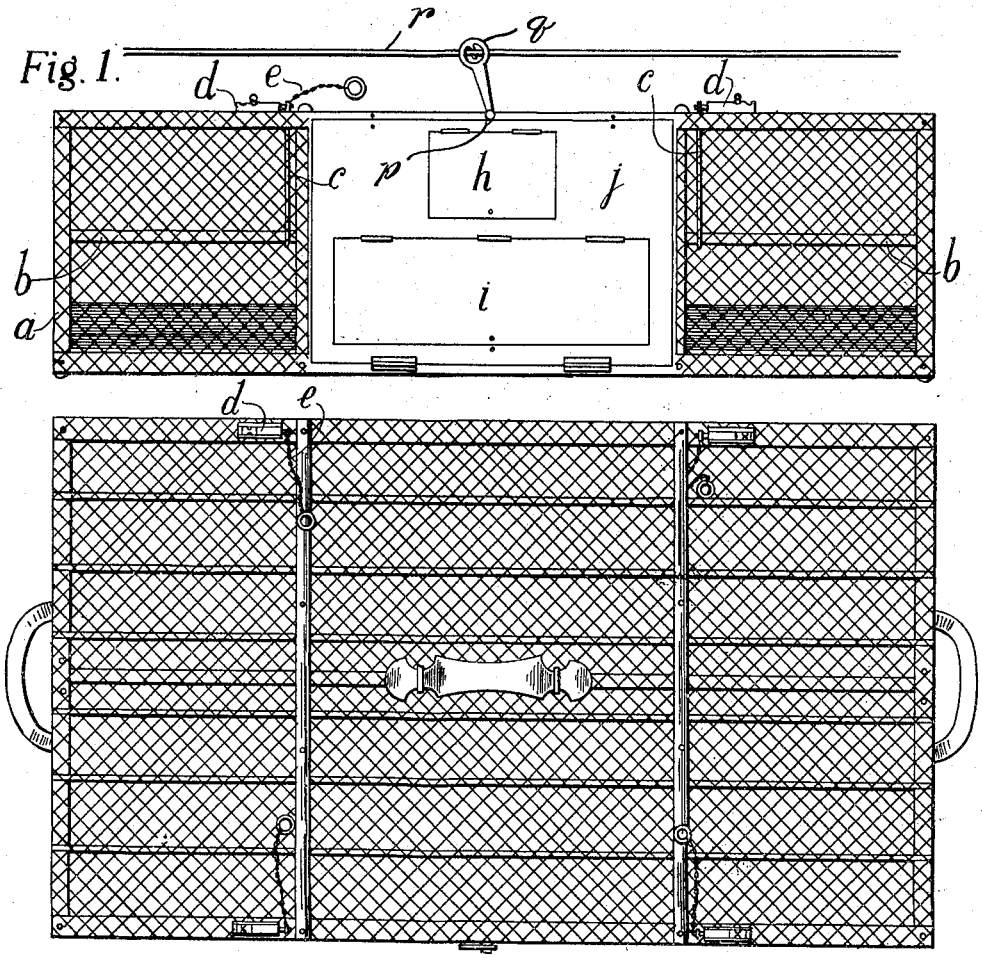
Fig. 1 is a front elevation of a cage made in accordance with this invention.
Fig. 2 is a plan of same.

The pannier $a$ has an additional loose floor $b$ which is capable of being suspended medially in the cage by cords $c$ or by chains, wires, folding hinges or by other suitable means, and retained in such position by bolts, hooks or the like $d$.

Short lengths of chain or cord $e$ are connected to the upper ends of the suspension wires, cords or the like in order to enable the supplementary floor to be raised to the required height.

A further improvement according to this invention is the provision of two small auxiliary doors $h$ and $i$ which are formed in the large door $j$ of the cage, each of these doors being hinged at its top edge and each having means for securing it in its closed and open position. These doors are provided for the entry and exit of the birds from the two compartments of the cage.

A still further improvement as shown in Fig. 3, comprises the provision of a water or food trough being pivotally suspended to the inner side of each of the two narrow doors in the back of the cage in such a manner as to enable them to be turned over to empty them or when not required for use.

The troughs $k$ are preferably connected to the inner face of the narrow door $i'$ and $i^2$ by means of pivots $m$ passing through L-shaped brackets $n$, these brackets being secured to the door as shown in Figs. 5 and 6. In Fig. 1 $o$ represents a pivoted catch for holding the door $j$ in its closed position, the lower part $p$, overlapping the upper edge of the door. The upper end of the catch $o$, is a ring shaped clamp $q$, through which passes a cord or wire $r$, which, being pulled, will operate the catch and release the door, to allow the birds to escape, the object being to allow the escape at the same time of the birds in a plurality of cages. This is an important provision in pigeon racing, but the devices referred to are not essentials of the present invention.

Claims:

1. A portable cage for the reception and manual transportation of live stock and particularly pigeons, comprising rigid frame members, strips of wire gauze connected to form walls, a movable floor for dividing the cage into a plurality of separate compartments, entry and exit means common to all the compartments and constituted by an opening in one wall and a door hinged thereto, said door being provided with means for access to each compartment separately and said floor being provided with means operative from the outside, for lowering and elevating it.

2. A cage for the manual transportation of live stock, comprising an openwork casing, a vertically movable floor within the same, dividing the cage into two compartments, means of entry common to both compartments and to each separately, and including a hinged door closing a main entry, and supplementary openings in said door provided with flaps to close the same.

In testimony whereof I have affixed my signature.

CLARENCE ARNOLD FELL.